(12) United States Patent
Tikoo et al.

(10) Patent No.: US 11,455,244 B2
(45) Date of Patent: Sep. 27, 2022

(54) ZONED NAMESPACE LIMITATION MITIGATION USING SUB BLOCK MODE

(71) Applicant: WESTERN DIGITAL TECHNOLOGIES, INC., San Jose, CA (US)

(72) Inventors: Rakshit Tikoo, Karnataka (IN); Adarsh Sreedhar, Karnataka (IN); Lovleen Arora, Karnataka (IN); Niraj Srimal, Karnataka (IN)

(73) Assignee: WESTERN DIGITAL TECHNOLOGIES, INC., San Jose, CA (US)

(*) Notice: Subject to any disclaimer, the term of this patent is extended or adjusted under 35 U.S.C. 154(b) by 0 days.

(21) Appl. No.: 17/180,625

(22) Filed: Feb. 19, 2021

(65) Prior Publication Data
US 2022/0075716 A1    Mar. 10, 2022

Related U.S. Application Data

(60) Provisional application No. 63/074,936, filed on Sep. 4, 2020.

(51) Int. Cl.
*G06F 12/02* (2006.01)
*G06F 12/0873* (2016.01)
*G06F 12/06* (2006.01)
*G06F 3/06* (2006.01)

(52) U.S. Cl.
CPC .......... *G06F 12/0246* (2013.01); *G06F 3/064* (2013.01); *G06F 3/0604* (2013.01); *G06F 3/0652* (2013.01); *G06F 3/0679* (2013.01); *G06F 12/0646* (2013.01); *G06F 12/0873* (2013.01); *G06F 2212/7201* (2013.01)

(58) Field of Classification Search
None
See application file for complete search history.

(56) References Cited

U.S. PATENT DOCUMENTS

| 9,368,130 B2 | 6/2016 | Jin et al. | |
| 9,449,698 B1 | 9/2016 | Paudel et al. | |
| 9,652,381 B2 | 5/2017 | Higgins et al. | |
| 2013/0223147 A1* | 8/2013 | Kwak | G11C 16/3427 365/185.11 |
| 2014/0133232 A1* | 5/2014 | Avila | G11C 16/26 365/185.11 |

(Continued)

*Primary Examiner* — Kevin Verbrugge
(74) *Attorney, Agent, or Firm* — ArentFox Schiff LLP

(57) ABSTRACT

Aspects of a storage device including a memory and a controller are provided which reduces or eliminates garbage collection in zoned namespace (ZNS) architectures by mapping zones to sub-blocks of blocks of the memory. Each zone includes a plurality of logical addresses. The controller determines a number of open zones, and maps the open zones to the sub-blocks in response to the number of open zones meeting a threshold. Thus, larger numbers of open blocks typically present in ZNS may be reduced, and increased block sizes due to scaling may be accommodated in ZNS. In some aspects, the controller receives a request from a host device to write data associated with the zones in sub-blocks, and maps each of the zones to at least one of the sub-blocks in response to the request. The request may indicate zones are partially unused. Thus, out of zone conditions may also be avoided.

18 Claims, 12 Drawing Sheets

(56) References Cited

U.S. PATENT DOCUMENTS

| | | | |
|---|---|---|---|
| 2014/0247664 A1* | 9/2014 | Hosono | G11C 16/3427 |
| | | | 365/185.17 |
| 2017/0308464 A1* | 10/2017 | Hwang | G06F 3/064 |
| 2019/0196744 A1 | 6/2019 | Kim | |
| 2019/0348127 A1 | 11/2019 | Chin et al. | |
| 2020/0167274 A1* | 5/2020 | Bahirat | G06F 3/064 |
| 2021/0389879 A1* | 12/2021 | Inbar | G11C 11/5628 |

* cited by examiner

US 11,455,244 B2

ZONED NAMESPACE LIMITATION MITIGATION USING SUB BLOCK MODE

CROSS-REFERENCE TO RELATED APPLICATION

This application claims the benefit of, and right of priority to, U.S. Provisional Patent Application No. 63/074,936, entitled "Zoned Namespace Limitation Mitigation Using Sub Block Mode," filed on Sep. 4, 2020, the entire contents of which are herein incorporated by reference as if fully set forth herein.

BACKGROUND

Field

This disclosure is generally related to electronic devices and more particularly to storage devices.

Background

Storage devices enable users to store and retrieve data. Examples of storage devices include non-volatile memory devices. A non-volatile memory generally retains data after a power cycle. An example of a non-volatile memory is a flash memory, which may include array(s) of NAND cells on one or more dies. Flash memory may be found in solid-state devices (SSDs), Secure Digital (SD) cards, and the like.

A flash storage device may store control information associated with data. For example, a flash storage device may maintain control tables that include a mapping of logical addresses to physical addresses. This control tables are used to track the physical location of logical sectors, or blocks, in the flash memory. The control tables are stored in the non-volatile memory to enable access to the stored data after a power cycle.

Zoned Namespace (ZNS) is an SSD namespace architecture in which the non-volatile memory is divided into fixed-sized groups of logical addresses, or zones. Each zone is used for a specific application. For example, the host may write data associated with different applications in different zones. Zones are spread across a single die, with each zone generally spanning 48 MB or 64 MB of size. The flash storage device interfaces with the host to obtain the defined zones, and maps the zones to blocks in the flash memory. Thus, the host may write separate application-related data into separate blocks of flash memory.

Traditionally, data in a flash storage device may be invalidated in small chunks (e.g. 4 KB of data), for example, when a host overwrites the data. To remove the invalidated data from the flash memory, the flash storage device performs a garbage collection (GC) process in which valid data may be copied to a new block and the invalidated data is erased from the old block. However, in ZNS, a zone is sequentially written before the data in the zone is invalidated, and thus the entire zone may be invalidated at once (e.g. 48 or 64 MB of data). This feature of ZNS reduces or eliminates GC, which in turn reduces write amplification (WA). As a result, ZNS may optimize the endurance of the flash storage device, as well as improve the consistency of input/output (I/O) command latencies.

SUMMARY

One aspect of a storage device is disclosed herein. The storage device includes a memory and a controller. The memory comprises a plurality of blocks, where each of the blocks includes a plurality of sub-blocks. The controller is configured to map a zone to at least one of the sub-blocks, where the zone includes a plurality of logical addresses.

Another aspect of a storage device is disclosed herein. The storage device includes a memory and a controller. The memory comprises a plurality of blocks, where each of the blocks includes a plurality of sub-blocks. The controller is configured to determine a number of open zones, and to map the open zones to the sub-blocks in response to the number of open zones meeting a threshold.

A further aspect of a storage device is disclosed herein. The storage device includes a memory and a controller. The memory comprises a plurality of blocks, where each of the blocks includes a plurality of sub-blocks. The controller is configured to receive a request to write data associated with zones in the sub-blocks, and to map each of the zones to at least one of the sub-blocks in response to the request.

It is understood that other aspects of the storage device will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

Figure 1:
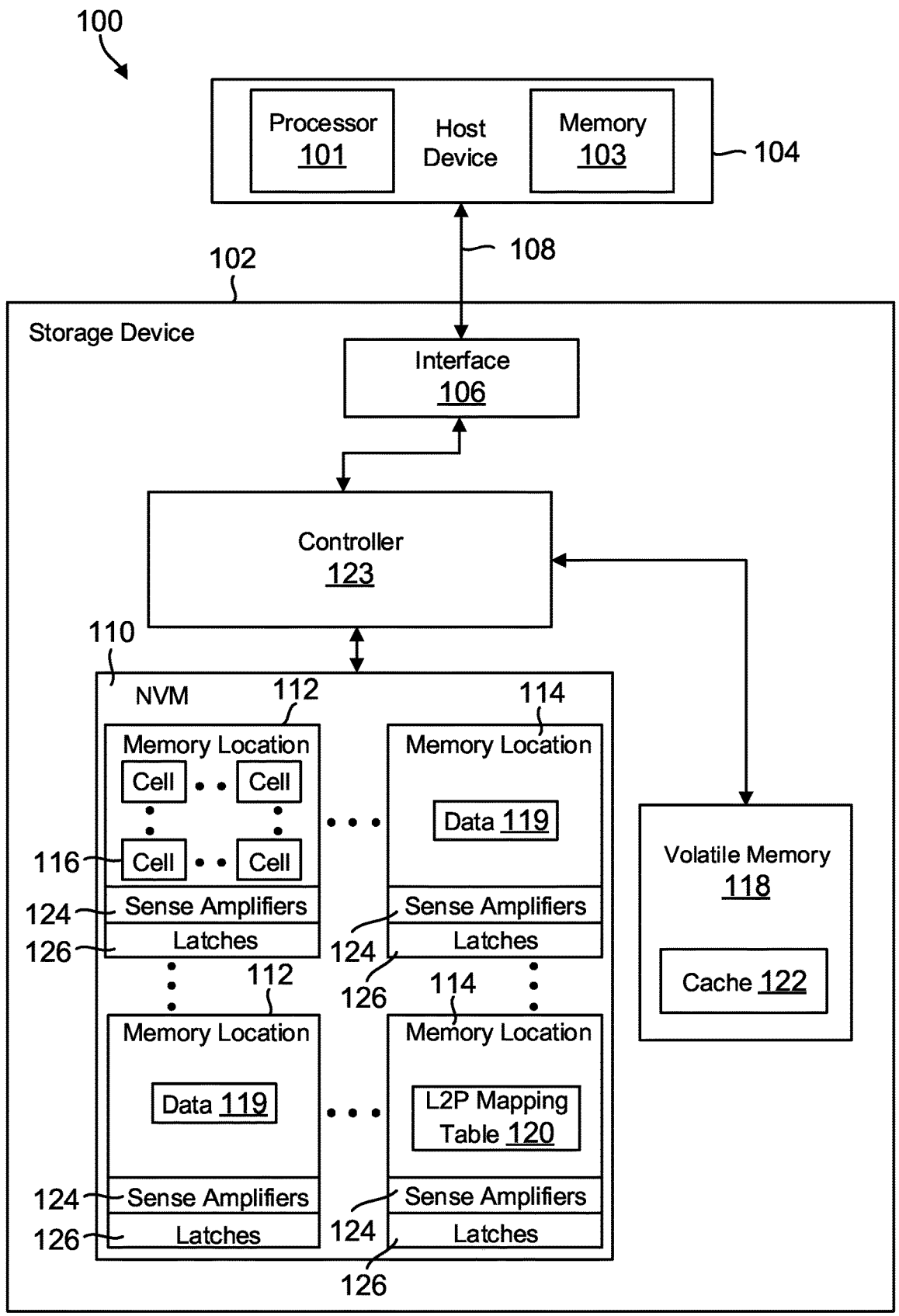
FIG. 1 is a block diagram illustrating an exemplary embodiment of a storage device in communication with a host device.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

As used herein, the term "coupled" is used to indicate either a direct connection between two components or, where appropriate, an indirect connection to one another through intervening or intermediate components. In contrast, when a component referred to as being "directly coupled" to another component, there are no intervening elements present.

In the following detailed description, various aspects of a storage device in communication with a host device will be presented. These aspects are well suited for flash storage devices, such as SSDs and SD cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

Typically, in ZNS, a host provides a definition of zones, or groups of logical addresses, to a flash storage device. For example, the host may indicate that one group of LBAs corresponding to 48 or 64 MB of data are associated with a first zone, that another group of LBAs corresponding to another 48 or 64 MB of data are associated with a second zone, and so forth. The flash storage device then maps each zone to a single block in the flash memory. For instance, the flash storage device may map the LBAs associated with the first zone to a first physical block, the LBAs associated with the second zone to a second physical block, etc. This one-to-one mapping of each zone to a block allows for the reduction or elimination of GC by effectively making the zones independent. For example, after sequentially writing data to a block mapped to one zone, the host may invalidate that zone by instructing the flash storage device to erase that block only, without impacting the data in other zones/blocks.

However, as a result of this zone-to-block mapping, ZNS may lead to a large number of open blocks in the flash storage device. For example, unlike traditional flash storage devices which typically have a small number of open blocks (e.g. 1 or 2 open blocks of multi-level cells (MLCs) such as quad-level cells (QLCs)), flash storage devices implementing ZNS may have significantly more open blocks depending on the number of applications of the host (e.g. between as low as 12 and as high as 4,000 open blocks). As open blocks are known to have poorer data retention (DR) properties (e.g. more flipped bit counts) than closed blocks, especially MLC open blocks such as QLC blocks, the data reliability or integrity of the flash storage device may be significantly impacted by ZNS.

Additionally, there is a trending increase in physical block sizes (e.g. numbers of word lines and strings) as flash storage devices move towards subsequent generations. For example, BICs4 flash storage devices currently have 96 word lines in a block, BICs5 flash storage devices may have 112 word lines in a block, and BICs6 flash storage devices are expected to have even more word lines in a block. Nevertheless, although the flash storage device may support increasing physical block sizes, the host may not be able to support different zone sizes (i.e. zone sizes are fixed in ZNS). This may lead to unused storage space in each block and thus wasted storage capacity. For example, even if the capacity of each block increases from 64 MB to 128 MB in future generations, the host may still only be able to write at most 64 MB of data in a zone that is mapped to each block, resulting in the remaining 64 MB of each block being unused.

Furthermore, while in some cases the host may have a small number of applications each associated with a large amount of data that the host may fill in a respective zone (e.g. 48 or 64 MB of data for a few applications or zones), in other cases the host may have a large number of applications each associated with only a small amount of data that the host may write in a respective zone (e.g. 24 or 32 MB of data for several applications or zones). If zones are mapped to individual physical blocks as described above, but the number of open blocks available to be mapped is limited, then in the latter case the flash storage device may run out of zones. For example, if only 10 open blocks are available in the flash storage device, but the host requires more than 10 zones for its application data, the flash storage device may not be able to efficiently support the host's requirements based on the one-zone/one-block mapping scheme, especially in the case where each application data size is small (e.g. half a zone size).

To mitigate the aforementioned limitations or effects of ZNS (e.g. a large number of open blocks with poor DR, a lack of adaptability to increased block sizes, and an inefficient running out of zone condition for small data applications), the controller utilizes sub-blocks for zones and mapping. In response to receiving a definition of zones from the host (e.g. a zone to logical address mapping) or some other message indicating that ZNS is to be used, the controller enables a sub-block mode (SBM). In the SBM, each block that is to be mapped to a zone is divided into a number of sub-blocks. For example, a block having 96 word lines (i.e. WL 0-95) may be divided such that the lower word lines (i.e. WL 0-47) are included in one sub-block and the upper word lines (i.e. WL 48-95) are included in another sub-block. The sub-blocks are configured to be independently programmable, readable, and eraseable; for example, different voltages may be applied to the word lines in a selected sub-block than in an un-selected sub-block to enable reading, programming, or erasing data in only the selected sub-block. This property of sub-blocks allows the independence of each zone, and thus the reduction or elimination of GC from ZNS, to be maintained.

Figure 9:
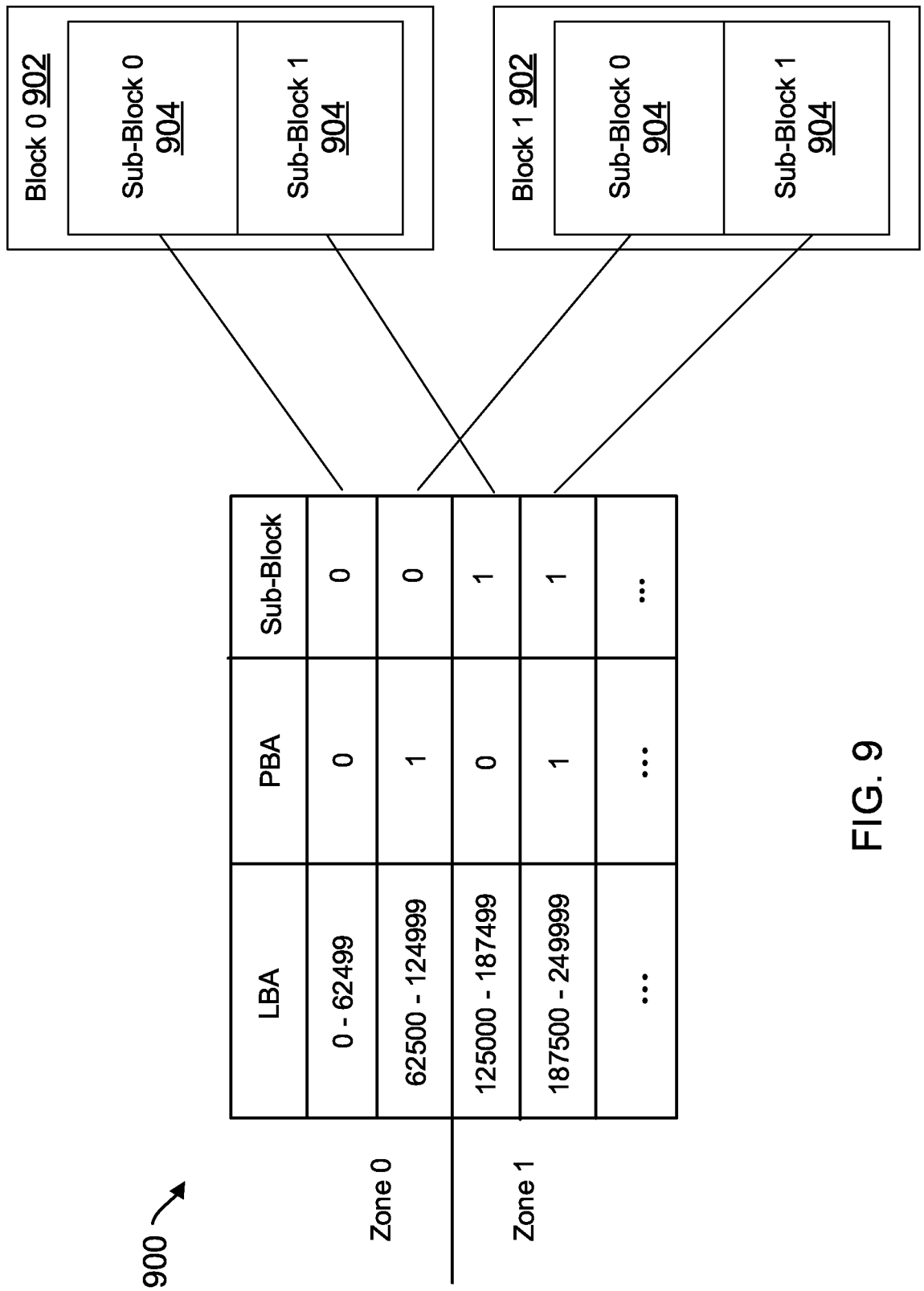
FIG. 9 is a conceptual diagram illustrating an example mapping of zones to sub-blocks by the controller in the storage device of FIG. 1.

To reduce the number of open blocks in the storage device and thus improve data retention, the controller may map each zone to two sub-blocks (in different blocks). For example, the controller may determine if the number of open blocks or zones is greater than an open zone threshold, in which case the controller may enable SBM and map half of each zone to a sub-block in one block and the other half of each zone to a sub-block in another block. Thus, each physical block may be mapped to two different zones, rather than to one zone as in traditional ZNS implementation. An example of this mapping is illustrated in FIG. 9. Such mapping serves to reduce the probability of having open blocks, since two partially written zones mapped to the same block may result in one closed block rather than in two open blocks as in traditional ZNS.

Figure 10:
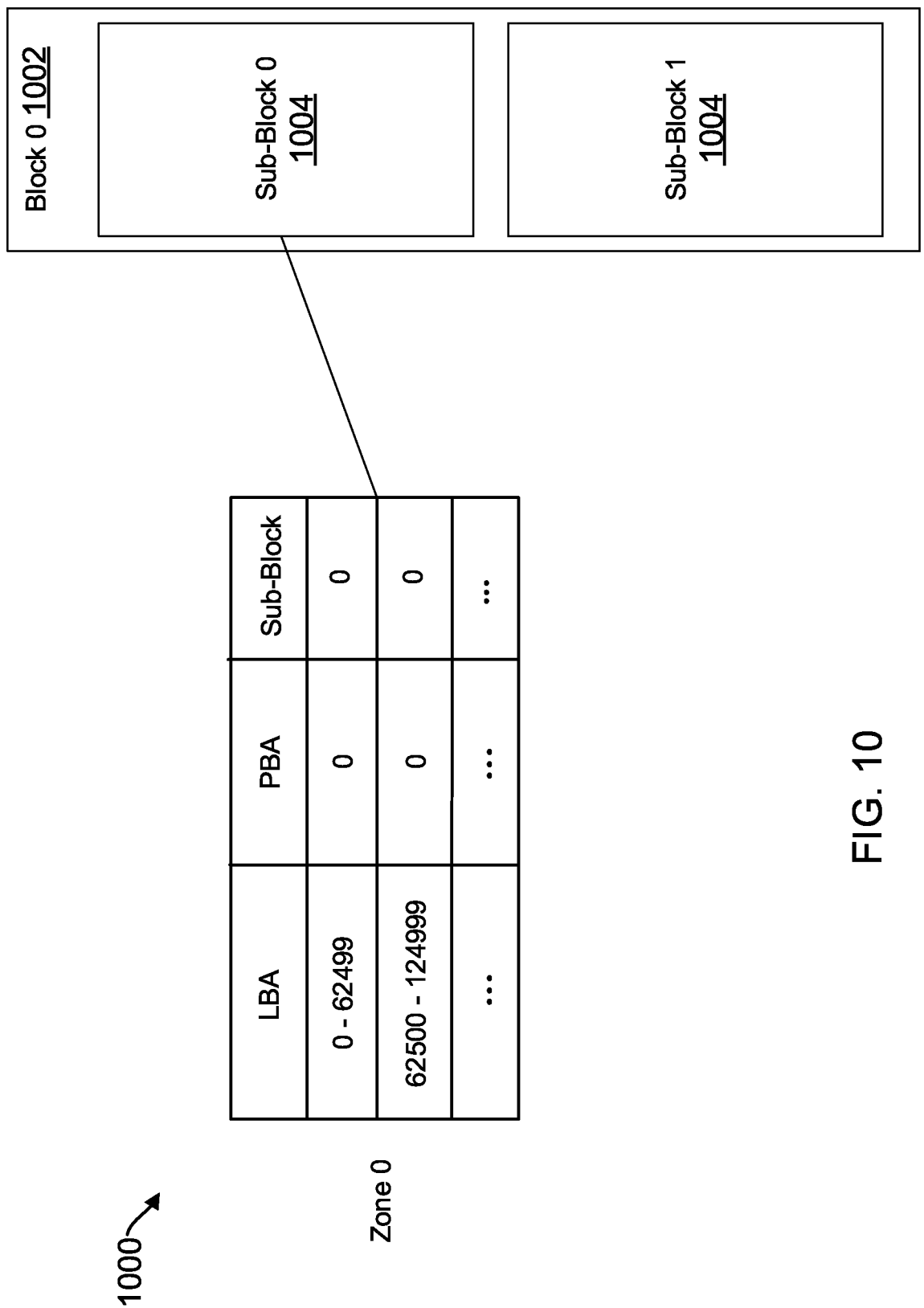
FIG. 10 is a conceptual diagram illustrating another example mapping of zones to sub-blocks by the controller in the storage device of FIG. 1.

Moreover, to maintain ZNS compatibility with increased block sizes, the controller may map each zone to one sub-block if such increased block sizes are equivalent to the zone size. For example, instead of mapping half of a zone to a sub-block as described above, if the sub-block size doubles, the controller may map the entire zone to the sub-block. An example of this mapping is illustrated in FIG. 10. Such mapping prevents unused space in each block from arising due to increased block sizes, thus eliminating the wasted storage capacity that may result from traditional ZNS implementations.

Figure 11:
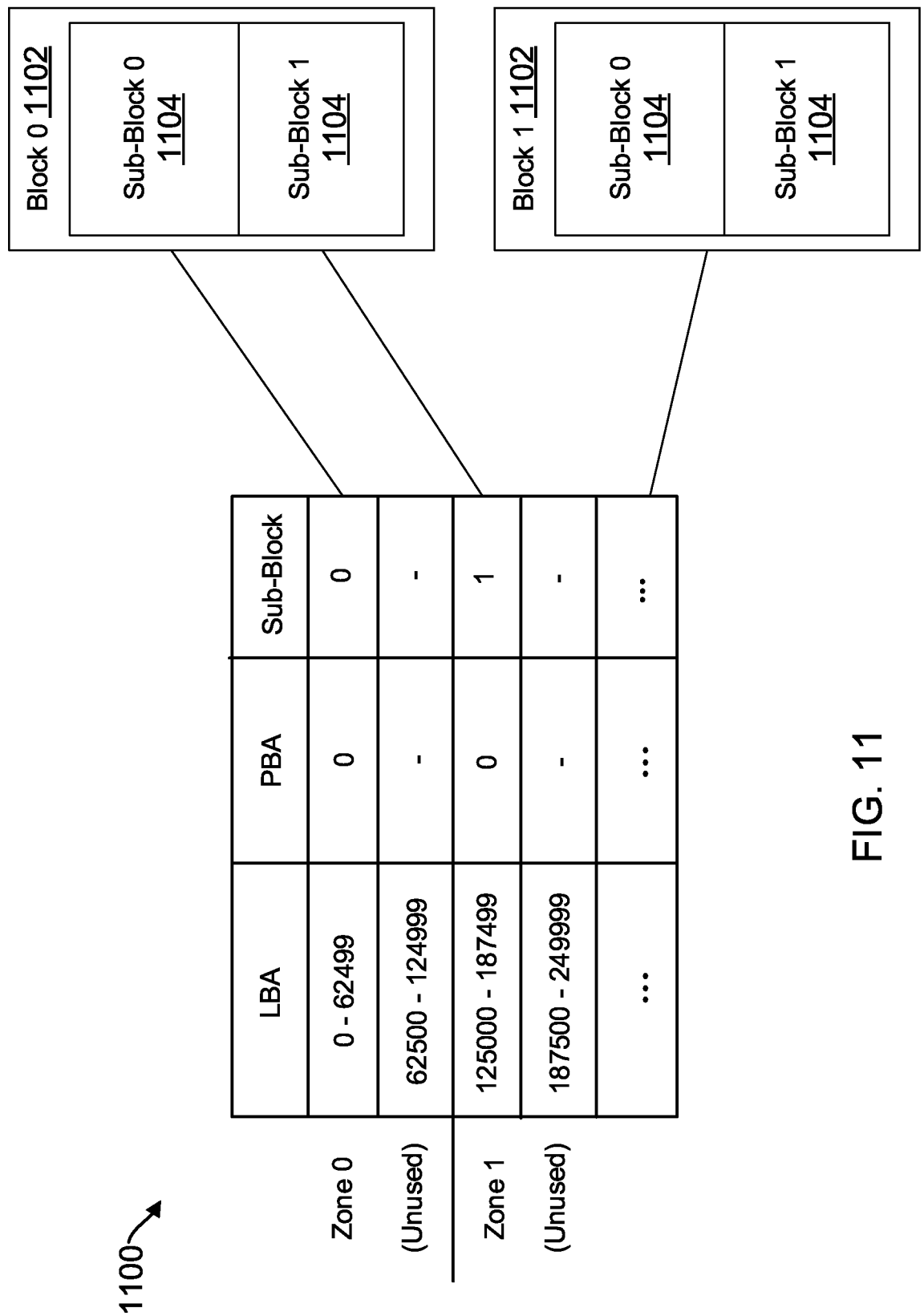
FIG. 11 is a conceptual diagram illustrating an additional example mapping of zones to sub-blocks by the controller in the storage device of FIG. 1.

Furthermore, to minimize a condition where the flash storage device runs out of zones in cases where the host manages multiple applications that only write a relatively small amount of data (e.g. half of a typical zone size such as 24 or 32 MB of data), the controller may activate SBM in response to a request from the host for SBM that indicates one or more applications will only write a small amount of data. For example, the indication may include identifiers of which zones are not to be completely written by the host, such as an indication that the host ensures only half of each indicated zone will be filled by a respective application. In such case, the controller may map each indicated zone to a single sub-block. An example of this mapping is illustrated in FIG. 11. Such mapping effectively creates more zones (of half capacity) by allowing more open blocks to be mapped for use with more applications than in traditional ZNS implementations.

FIG. 1 shows an exemplary block diagram 100 of a storage device 102 which communicates with a host device 104 (also "host") according to an exemplary embodiment. The host 104 and the storage device 102 may form a system, such as a computer system (e.g., server, desktop, mobile/laptop, tablet, smartphone, etc.). The components of FIG. 1 may or may not be physically co-located. In this regard, the host 104 may be located remotely from storage device 102. Although FIG. 1 illustrates that the host 104 is shown separate from the storage device 102, the host 104 in other embodiments may be integrated into the storage device 102, in whole or in part. Alternatively, the host 104 may be distributed across multiple remote entities, in its entirety, or alternatively with some functionality in the storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host(s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. The at least one processor 101 may include any form of hardware capable of processing data and may include a general purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), and any other type of non-volatile memory devices. In other examples, the host memory 103 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

The host interface 106 is configured to interface the storage device 102 with the host 104 via a bus/network 108, and may interface using, for example, Ethernet or WiFi, or a bus standard such as Serial Advanced Technology Attachment (SATA), PCI express (PCIe), Small Computer System Interface (SCSI), or Serial Attached SCSI (SAS), among other possible candidates. Alternatively, the host interface 106 may be wireless, and may interface the storage device 102 with the host 104 using, for example, cellular communication (e.g. 5G NR, 4G LTE, 3G, 2G, GSM/UMTS, CDMA One/CDMA2000, etc.), wireless distribution methods through access points (e.g. IEEE 802.11, WiFi, HiperLAN, etc.), Infra Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

The storage device 102 includes a memory. For example, in the exemplary embodiment of FIG. 1, the storage device 102 may include a non-volatile memory (NVM) 110 for persistent storage of data received from the host 104. The NVM 110 can include, for example, flash integrated circuits, NAND memory (e.g., single-level cell (SLC) memory, multi-level cell (MLC) memory, triple-level cell (TLC) memory, quad-level cell (QLC) memory, penta-level cell (PLC) memory, or any combination thereof), or NOR memory. The NVM 110 may include a plurality of memory locations 112 which may store system data for operating the storage device 102 or user data received from the host for storage in the storage device 102. For example, the NVM may have a cross-point architecture including a 2-D NAND array of memory locations 112 having n rows and m columns, where m and n are predefined according to the size of the NVM. In the exemplary embodiment of FIG. 1, each memory location 112 may be a die 114 including multiple planes each including multiple blocks of multiple cells 116. Alternatively, each memory location 112 may be a plane including multiple blocks of the cells 116. The cells 116 may be single-level cells, multi-level cells, triple-level cells, quad-level cells, and/or penta-level cells, for example. Other examples of memory locations 112 are possible; for instance, each memory location may be a block or group of blocks. Each memory location may include one or more blocks in a 3-D NAND array. Each memory location 112 may include one or more logical blocks which are mapped to one or more physical blocks. Alternatively, the memory and each memory location may be implemented in other ways known to those skilled in the art.

The storage device 102 also includes a volatile memory 118 that can, for example, include a Dynamic Random Access Memory (DRAM) or a Static Random Access Memory (SRAM). Data stored in volatile memory 118 can include data read from the NVM 110 or data to be written to the NVM 110. In this regard, the volatile memory 118 can include a write buffer or a read buffer for temporarily storing data. While FIG. 1 illustrates the volatile memory 118 as being remote from a controller 123 of the storage device 102, the volatile memory 118 may be integrated into the controller 123.

The memory (e.g. NVM 110) is configured to store data 119 received from the host device 104. The data 119 may be stored in the cells 116 of any of the memory locations 112. As an example, FIG. 1 illustrates data 119 being stored in different memory locations 112, although the data may be stored in the same memory location. In another example, the memory locations 112 may be different dies, and the data may be stored in one or more of the different dies.

Each of the data 119 may be associated with a logical address. For example, the NVM 110 may store a logical-to-physical (L2P) mapping table 120 for the storage device 102 associating each data 119 with a logical address. The L2P mapping table 120 stores the mapping of logical addresses specified for data written from the host 104 to physical addresses in the NVM 110 indicating the location(s) where each of the data is stored. This mapping may be performed by the controller 123 of the storage device. The L2P mapping table may be a table or other data structure which includes an identifier such as a logical block address (LBA) associated with each memory location 112 in the NVM where data is stored. While FIG. 1 illustrates a single L2P mapping table 120 stored in one of the memory locations 112 of NVM to avoid unduly obscuring the concepts of FIG. 1, the L2P mapping table 120 in fact may include multiple tables stored in one or more memory locations of NVM.

Figure 2:
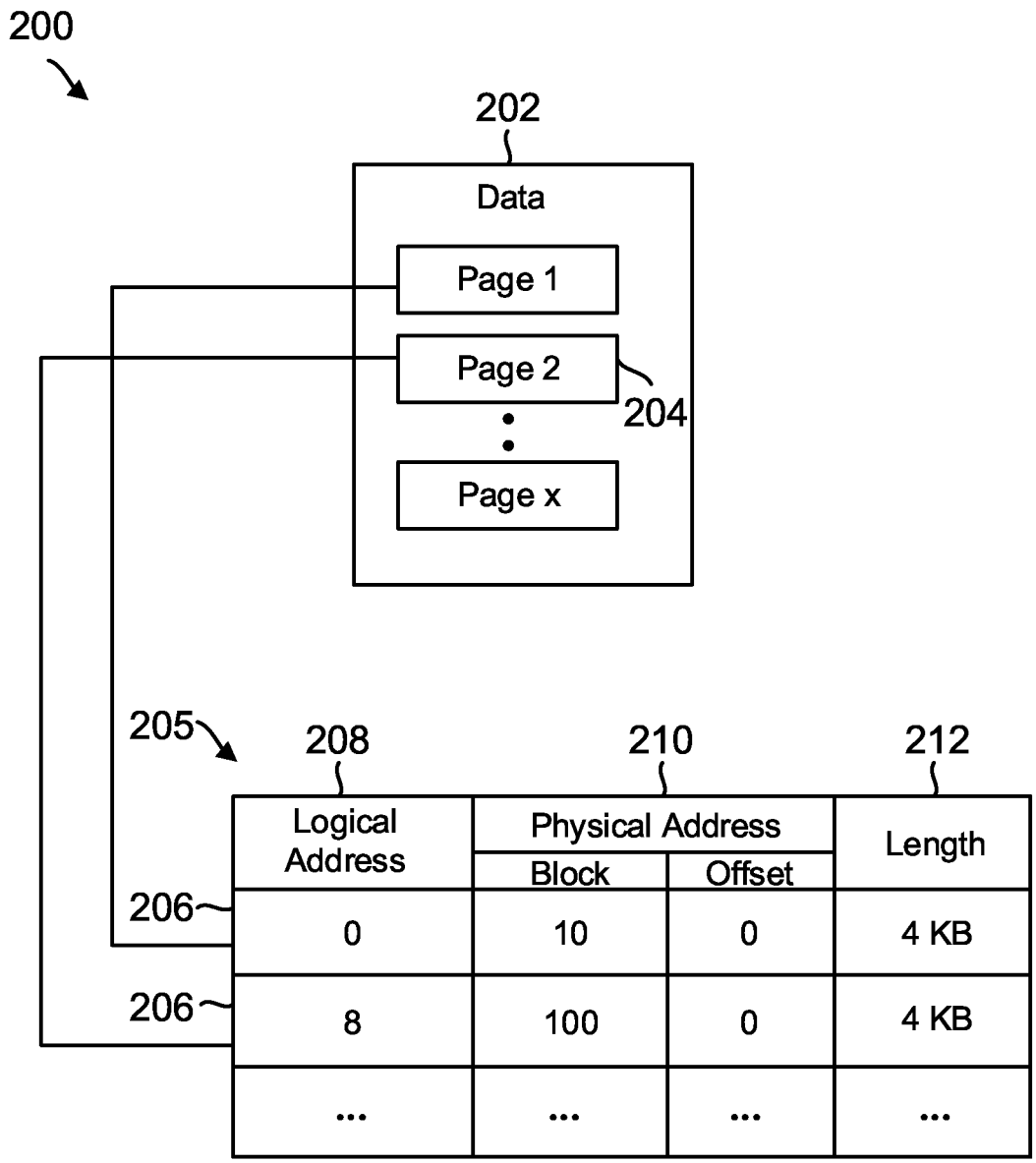
FIG. 2 is a conceptual diagram illustrating an example of a logical-to-physical mapping table in a non-volatile memory of the storage device of FIG. 1.

FIG. 2 is a conceptual diagram 200 of an example of an L2P mapping table 205 illustrating the mapping of data 202 received from a host device to logical addresses and physical addresses in the NVM 110 of FIG. 1. The data 202 may correspond to the data 119 in FIG. 1, while the L2P mapping table 205 may correspond to the L2P mapping table 120 in FIG. 1. In one exemplary embodiment, the data 202 may be stored in one or more pages 204, e.g., pages 1 to x, where x is the total number of pages of data being written to the NVM 110. Each page 204 may be associated with one or more entries 206 of the L2P mapping table 205 identifying a logical block address (LBA) 208, a physical address 210 associated with the data written to the NVM, and a length 212 of the data. LBA 208 may be a logical address specified in a write command for the data received from the host device. Physical address 210 may indicate the block and the offset at which the data associated with LBA 208 is physically written. Length 212 may indicate a size of the written data (e.g. 4 KB or some other size).

Referring back to FIG. 1, the volatile memory 118 also stores a cache 122 for the storage device 102. The cache 122 includes entries showing the mapping of logical addresses specified for data requested by the host 104 to physical addresses in NVM 110 indicating the location(s) where the data is stored. This mapping may be performed by the controller 123. When the controller 123 receives a read command or a write command for data 119, the controller checks the cache 122 for the logical-to-physical mapping of each data. If a mapping is not present (e.g. it is the first request for the data), the controller accesses the L2P mapping table 120 and stores the mapping in the cache 122. When the controller 123 executes the read command or write command, the controller accesses the mapping from the cache and reads the data from or writes the data to the NVM 110 at the specified physical address. The cache may be stored in the form of a table or other data structure which includes a logical address associated with each memory location 112 in NVM where data is being read.

The NVM 110 includes sense amplifiers 124 and data latches 126 connected to each memory location 112. For example, the memory location 112 may be a block including cells 116 on multiple bit lines, and the NVM 110 may include a sense amplifier 124 on each bit line. Moreover, one or more data latches 126 may be connected to the bit lines and/or sense amplifiers. The data latches may be, for example, shift registers. When data is read from the cells 116 of the memory location 112, the sense amplifiers 124 sense the data by amplifying the voltages on the bit lines to a logic level (e.g. readable as a '0' or a '1'), and the sensed data is stored in the data latches 126. The data is then transferred from the data latches 126 to the controller 123, after which the data is stored in the volatile memory 118 until it is transferred to the host device 104. When data is written to the cells 116 of the memory location 112, the controller 123 stores the programmed data in the data latches 126, and the data is subsequently transferred from the data latches 126 to the cells 116.

The storage device 102 includes a controller 123 which includes circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof.

The controller 123 is configured to receive data transferred from one or more of the cells 116 of the various memory locations 112 in response to a read command. For example, the controller 123 may read the data 119 by activating the sense amplifiers 124 to sense the data from cells 116 into data latches 126, and the controller 123 may receive the data from the data latches 126. The controller 123 is also configured to program data into one or more of the cells 116 in response to a write command. For example, the controller 123 may write the data 119 by sending data to the data latches 126 to be programmed into the cells 116. The controller 123 is further configured to access the L2P mapping table 120 in the NVM 110 when reading or writing data to the cells 116. For example, the controller 123 may receive logical-to-physical address mappings from the NVM 110 in response to read or write commands from the host device 104, identify the physical addresses mapped to the logical addresses identified in the commands (e.g. translate the logical addresses into physical addresses), and access or store data in the cells 116 located at the mapped physical addresses.

The controller 123 and its components may be implemented with embedded software that performs the various functions of the controller described throughout this disclosure. Alternatively, software for implementing each of the aforementioned functions and components may be stored in the NVM 110 or in a memory external to the storage device 102 or host device 104, and may be accessed by the controller 123 for execution by the one or more processors of the controller 123. Alternatively, the functions and components of the controller may be implemented with hardware in the controller 123, or may be implemented using a combination of the aforementioned hardware and software.

In operation, the host device 104 stores data in the storage device 102 by sending a write command to the storage device 102 specifying one or more logical addresses (e.g., LBAs) as well as a length of the data to be written. The interface element 106 receives the write command, and the controller allocates a memory location 112 in the NVM 110 of storage device 102 for storing the data. The controller 123 stores the L2P mapping in the NVM (and the cache 122) to map a logical address associated with the data to the physical address of the memory location 112 allocated for the data. The controller also stores the length of the L2P mapped data. The controller 123 then stores the data in the memory location 112 by sending it to one or more data latches 126 connected to the allocated memory location, from which the data is programmed to the cells 116.

The host 104 may retrieve data from the storage device 102 by sending a read command specifying one or more logical addresses associated with the data to be retrieved from the storage device 102, as well as a length of the data to be read. The interface 106 receives the read command, and the controller 123 accesses the L2P mapping in the cache 122 or otherwise the NVM to translate the logical addresses specified in the read command to the physical addresses indicating the location of the data. The controller 123 then reads the requested data from the memory location 112 specified by the physical addresses by sensing the data using the sense amplifiers 124 and storing them in data latches 126 until the read data is returned to the host 104 via the host interface 106.

Figure 3:
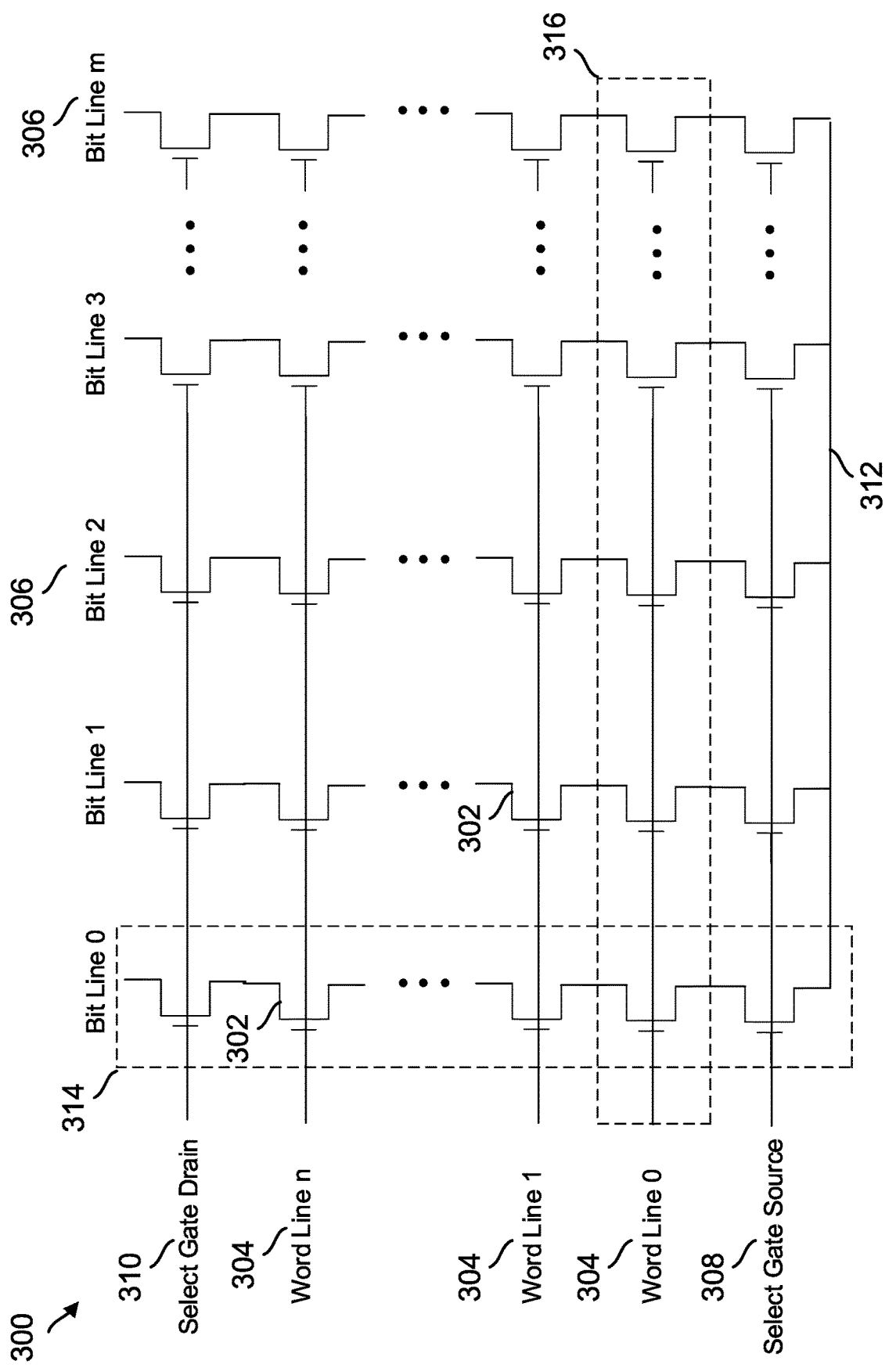
FIG. 3 is a conceptual diagram illustrating an example of an array of memory cells in the storage device of FIG. 1.

FIG. 3 illustrates an example of a NAND memory array 300 of cells 302. Cells 302 may correspond to cells 116 in the NVM 110 of FIG. 1. Multiple cells 302 are coupled to word lines 304 and bit lines 306. For example, the memory array 300 may include n word lines and m bit lines within a block of a die 114 of the NVM 110, where n and m are predefined according to the size of the block. Each word line and bit line may be respectively associated with a row and column address, which the controller 123 may use to select particular word lines and bit lines (e.g. using a row and column decoder). For example, word lines 0-n may each be associated with their own row address (e.g. word line 0 may correspond to word line address 0, word line 1 may correspond to word line address 1, etc.), and bit lines 0-m may each be associated with their own column address (e.g. bit line 0 may correspond to bit line address 0, bit line 1 may correspond to bit line address 1, etc.). Select gate source (SGS) cells 308 and select gate drain (SGD) cells 310 are coupled to the memory cells 302 on each bit line 306. The SGS cells 308 and SGD cells 310 connect the memory cells 302 to a source line 312 (e.g. ground) and bit lines 306, respectively. A string 314 may include a group of cells 302 (including SGS and SGD cells 308, 310) coupled to one bit line within a block, while a page 316 may include a group of cells 302 coupled to one word line within the block.

Figure 4:
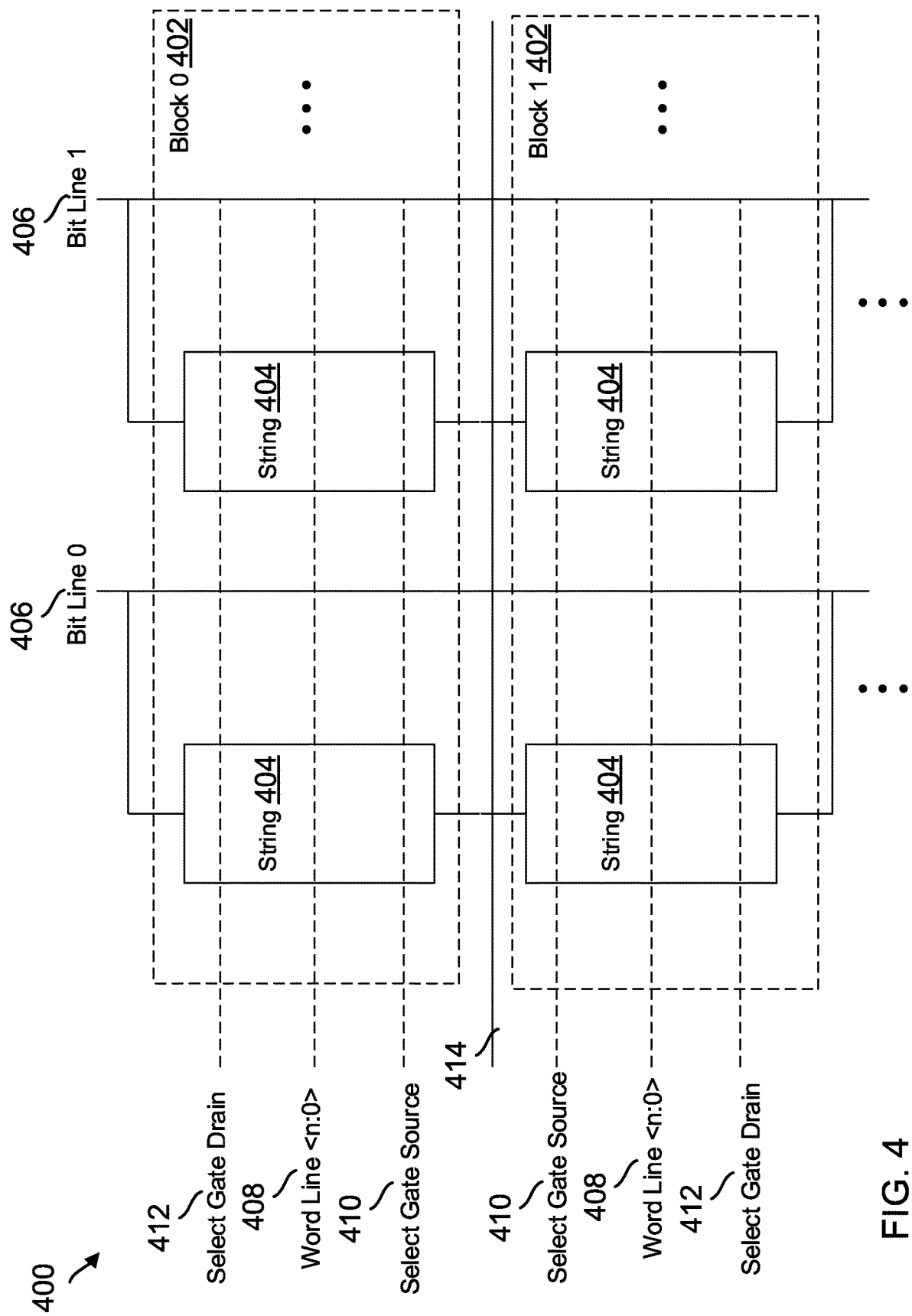
FIG. 4 is a conceptual diagram illustrating an example of an array of blocks in the storage device of FIG. 1.

FIG. 4 illustrates an example of a NAND memory array 400 of blocks 402 including multiple strings 404. Blocks 402 may correspond to blocks of a die 114 in the NVM 110 of FIG. 1, and strings 404 may each correspond to string 314 in FIG. 3. As in the memory array 300 of FIG. 3, each string 404 may include a group of memory cells each coupled to a bit line 406 and individually coupled to respective word lines 408. Similarly, each string may include a SGS cell 410 and SGD cell 412 which respectively connects the memory cells in each string 404 to a source line 414 and bit line 406.

When the controller 123 reads data from or writes data to a page 316 of cells 302 (i.e. on a word line 304, 408), the controller may send a command to apply a read voltage or program voltage to the selected word line and a pass through voltage to the other word lines. The read or programmed state of the cell (e.g. a logic '0' or a logic '1' for SLCs) may then be determined based on a threshold voltage of the cells 302. For example, during an SLC read operation, if the threshold voltage of a cell 302 is smaller than the read voltage (i.e. current flows through the cell in response to the read voltage), the controller 123 may determine that the cell stores a logic '1', while if the threshold voltage of the cell 302 is larger than the read voltage (i.e. current does not flow through the cell in response the read voltage), the controller 123 may determine that the cell stores a logic '0'. Similarly, during an SLC program operation, the controller may store a logic '0' by sending a command to apply the program voltage to the cell 302 on the word line 304, 408 until the cell reaches the threshold voltage, and during an erase operation, the controller may send a command to apply an erase voltage to the block 402 including the cells 302 (e.g. to a substrate of the cells such as a p-well) until the cells reduce back below the threshold voltage (back to logic '1').

Figure 5:
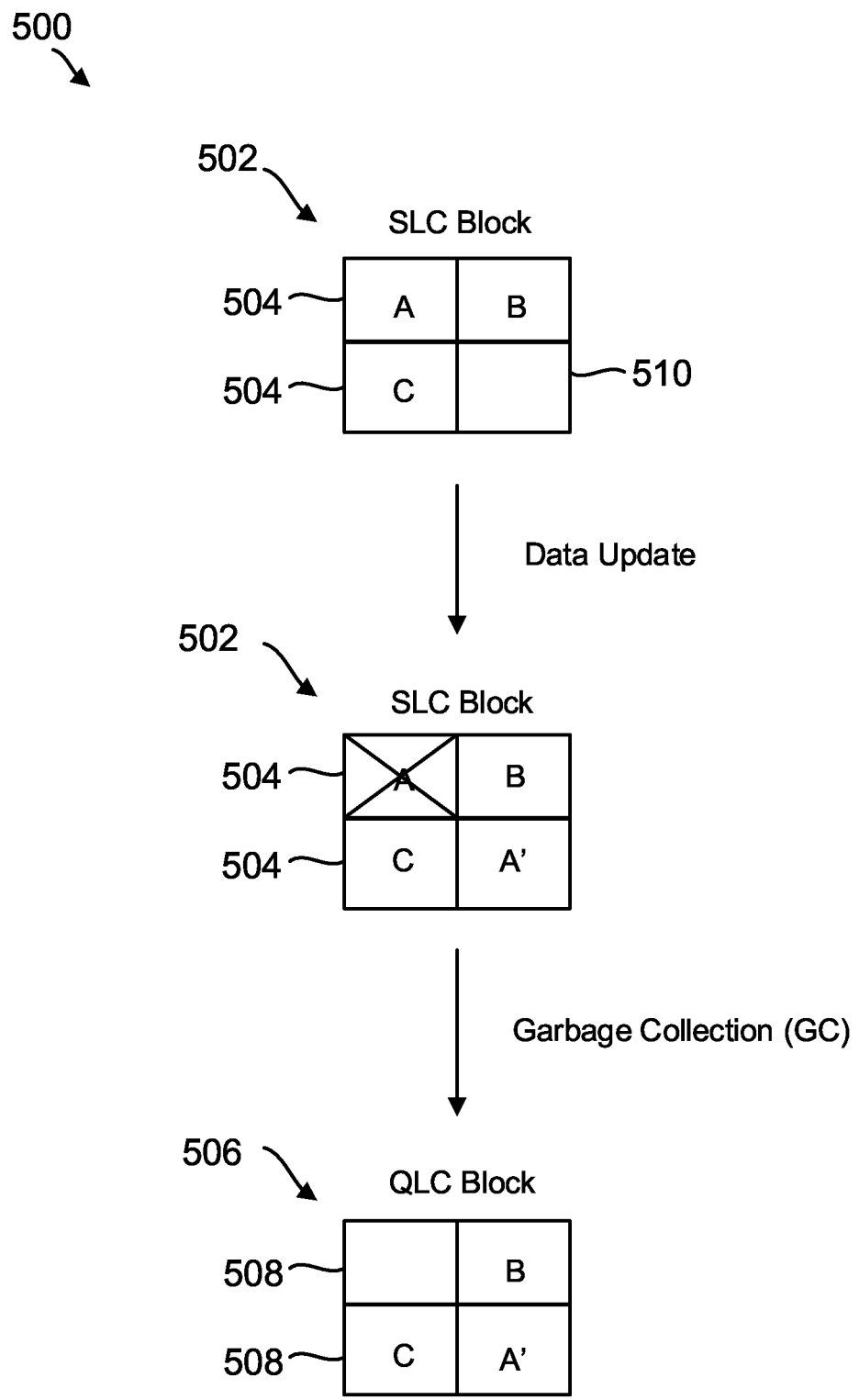
FIG. 5 is a conceptual diagram illustrating an example of a garbage collection (GC) process that may be implemented in the storage device of FIG. 1.

FIG. 5 is a conceptual diagram 500 of an example of a garbage collection process in which data stored in pages 504 of a block 502 of SLC cells are relocated to pages 508 of a block 506 of QLC cells. The data may correspond to the data 119 of FIG. 1, the blocks 502, 506 may correspond to blocks 402 of FIG. 4, and the SLC/QLC cells may correspond to the cells 116, 302 of FIGS. 1 and 3. Each page 504, 508 includes data stored in multiple cells along a same row or word line (e.g. word line 304, 408) of the NVM. Thus, each page 504 may include data stored in a row of the cells 116 of one block, while each page 508 may include data stored in a row of the cells 116 of another block. For simplicity of illustration, the example of FIG. 5 illustrates the blocks 502, 506 each including only four pages 504, 508. However, it should be recognized that each block may include any number of pages.

In the example of FIG. 5, data represented by identifiers A, B, and C are stored in different pages 504 of the block 502. Originally, the data A, B, and C are stored in three pages of the block 502 in response to write commands from the host device, leaving one of the pages free in this example. When the storage device receives new or updated data, this data is stored in the free page 510. For example, updated data A' may be received from the host device and written to the free page 510. Since data cannot be overwritten in flash memory, the invalid data A remains stored in the block 502. As a result of new data and invalid data, the block 502 may quickly become full.

To free space in the SLC block, original and updated data in the block 502 may be transferred to the block 506. The invalid data remain in the old block. For instance, in the example of FIG. 5, the original data B and C and the updated data A' are read from the pages 504 of the block 502 and written to one or more pages 508 of the block 506. The invalid data A remains in the block 502. When the block 502 is subsequently erased, the invalid data is discarded, and the block 502 may be reused to store new data.

Figure 6:
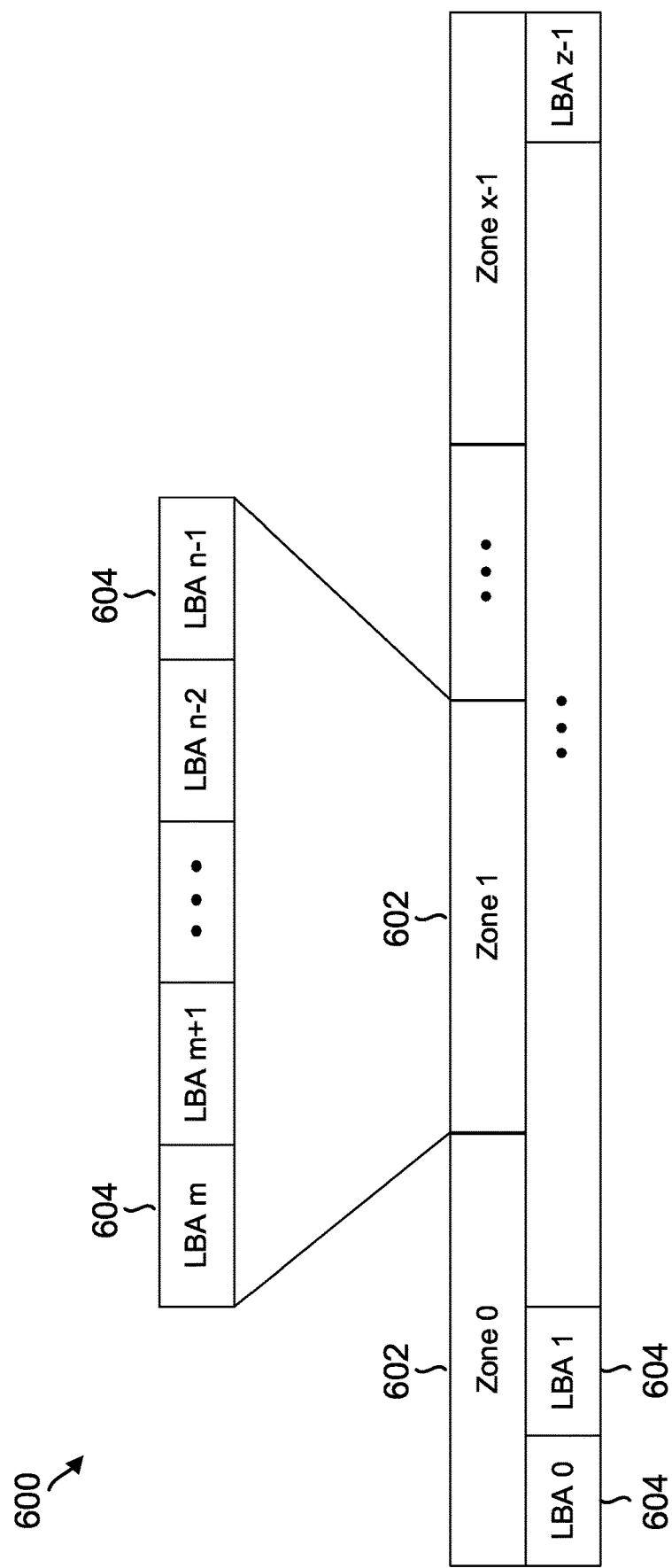
FIG. 6 is a conceptual diagram illustrating an example of an association of zones to groups of logical addresses that is received by the storage device of FIG. 1.

However, such GC process may lead to increased write amplification of the storage device 102, for example, in cases where multiple 4 KB data overwrites occur. To reduce or eliminate GC and thereby reduce write amplification of the storage device, the storage device 102 may implement ZNS, in which groups of contiguous, non-overlapping logical addresses are divided into zones. FIG. 6 illustrates a conceptual diagram 600 of an example of zones 602. Each zone 602 is fixed in size and includes a contiguous range of sequential logical addresses 604 in the NVM 110. For instance as illustrated, the NVM 110 may include a total of z LBAs that are divided into x zones, with each zone including a range of n-m sequential LBAs, where z represents the total number of sectors in flash memory, x represents the number of zones, m represents a first LBA in a zone, and n represents a last LBA in the same zone. Each zone may be separately used by the host for storing data associated with one or more applications run by the host. Thus, the host 104 may divide the LBAs into a number of zones depending on the number of applications run by the host.

Figure 7:
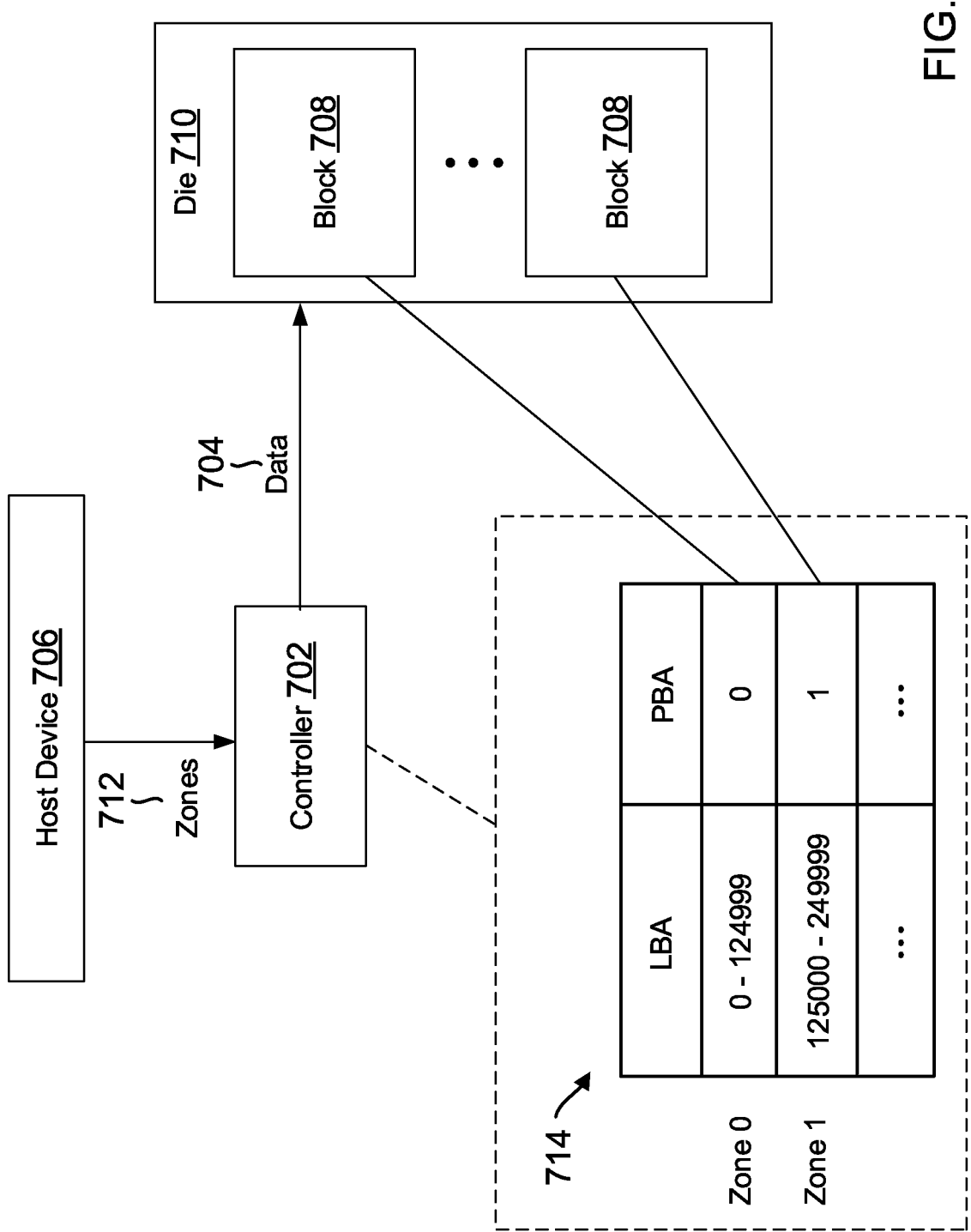
FIG. 7 is a conceptual diagram illustrating an example of a controller of the storage device of FIG. 1 that writes data to blocks mapped to different zones.

FIG. 7 illustrates an example diagram 700 of a controller 702 of a storage device that writes data 704 received from a host device 706 in blocks 708 of a die 710 according to zones 712. For example, controller 702 may correspond to controller 123 of the storage device 102 in FIG. 1, host device 706 may correspond to host 104 in FIG. 1, blocks 708 may correspond to blocks 402 of FIG. 4, data 704 may correspond to data 119 of FIG. 1, and zones 712 may correspond to zones 602 of FIG. 6. Traditionally, the host 706 may send a definition of the zones 712 (e.g. a mapping of zones 602 to logical addresses 604 in FIG. 6) to the controller 702, and the controller may create an L2P mapping table 714 (e.g. L2P mapping table 120, 205) that maps the LBAs of each zone 712 (e.g. logical addresses 604) to a single physical block (e.g. block 402). In the example of FIG. 7, each zone is assumed to span 64 MB in size with a 512 byte sector size, and thus each zone may include 125000 LBAs. Moreover, each block is assumed to be able to store 64 MB of data. Thus, zone 0 may be mapped solely to one block (e.g. PBA 0), zone 1 may be mapped solely to another block (e.g. PBA 1), etc. Each application of the host may then write data to a respective zone, e.g., by indicating a sequential range of LBAs to the controller. For instance, the host 706 may send write commands to the controller 702 to write data sequentially from LBA 0 to LBA 124999 and/or sequentially from LBAs 125000 to 249999. The controller may translate the indicated LBAs to the mapped physical address (e.g. PBA 0 or 1 respectively), and write the data in the mapped block 708 accordingly. Thus, the host may write data from different applications into different physical blocks individually corresponding to different zones.

A primary advantage of ZNS is that the host cannot write and invalidate data page by page (e.g. between 4 KB commands) as described above in FIG. 5. For example, when writing data to zone 1 in FIG. 6, the host cannot simply write data to LBA m, and then immediately afterwards write new data to LBA m while invalidating the old data at LBA m. Rather, the entire zone must be fully written (i.e. from LBA m to LBA n−1 in one or multiple writes) before writing data again to previous LBAs in that zone. Thus, in the example of FIG. 7 with respect to zone 0, if the host writes data in LBA 0, the host must continue to write data sequentially from LBA 1 until LBA 124999 (in one or multiple writes at various times) before the host can eventually write new data back in LBA 0. This feature of ZNS prevents blocks mapped to various zones from including partially invalid data that would require GC (such as shown in FIG. 5), thus reducing or eliminating GC and improving write amplification.

However, the traditional implementation of ZNS may also have multiple disadvantages. First, ZNS may lead to a larger number open blocks (tending to have poorer data retention (DR) properties than closed blocks) in the storage device 102 than implementations without ZNS. Typically, without ZNS, the controller 123 maintains one or two open blocks in the entire NVM 110. In contrast, when zones are mapped to individual physical blocks in ZNS, the controller 123 may maintain at least one open block for every zone in the NVM 110. Thus, when the number of zones is large (e.g. if the host has numerous applications each corresponding to a zone), the number of open blocks may likewise be significant, resulting in significantly poorer overall DR of the storage device. Second, while zone sizes remain fixed in ZNS, block sizes tend to scale or increase over time. Such scaling may cause additional, unused storage space to result when mapping fixed-size zones to individual physical blocks. Allocating this additional space to another zone would defeat the benefit of ZNS since GC would likely be required in such instance. For example, if one zone is completely written to a scaled block (and thus can be invalidated) while another zone is only partially written to the remainder of the scaled block (and thus cannot be invalidated), GC would still be required to protect the valid data. Third, when the host has numerous applications each requesting one or more zones for storing data in ZNS, but the number of blocks available in the storage device is limited, a running out of zones condition may occur when zones are mapped to individual physical blocks. Such condition may be inefficient, especially in cases where one or more applications of the host do not even require the entire block to be available for the data (e.g. the applications only write a small amount of data in each block).

To mitigate these limitations of ZNS, the controller may map zones to sub-blocks rather than individual blocks. In 3-D NAND devices, groups of word lines may be separated into different sub-blocks. For example, a stack of lower word lines in one memory hole tier may be separated by one or more dummy word lines and/or a joint area from a stack of upper word lines in another memory hole tier. Thus, assuming 128 word lines in a block, the stack of lower word lines (e.g. WLs 0-63) may be considered one sub-block and the stack of upper word lines (e.g. WLs 64-127) may be considered another sub-block. The structure of the sub-blocks allows for the word-lines within each sub-block to be independently read or programmed, and the sub-block to be independently erased. The controller may perform such independent reads/programs/erases in different sub-blocks in response to a sub-block mode (SBM) enable command that the controller sends to NAND. For example, the controller may send a command to a die to activate a SBM, in response to which different voltages may be applied to the word lines in different sub-blocks of the die to perform simultaneous reads and programs or independent erases. For example, to read or write data simultaneously in different sub-blocks, the controller may apply read or program voltages to the selected word lines in the sub-blocks and pass through voltages to the unselected word lines in the sub-blocks when SBM is enabled. Similarly, the controller may independently erase different sub-blocks by applying low voltages to word lines in a selected sub-block and high voltages to word lines in an un-selected sub-block when SBM is enabled.

Figure 8:
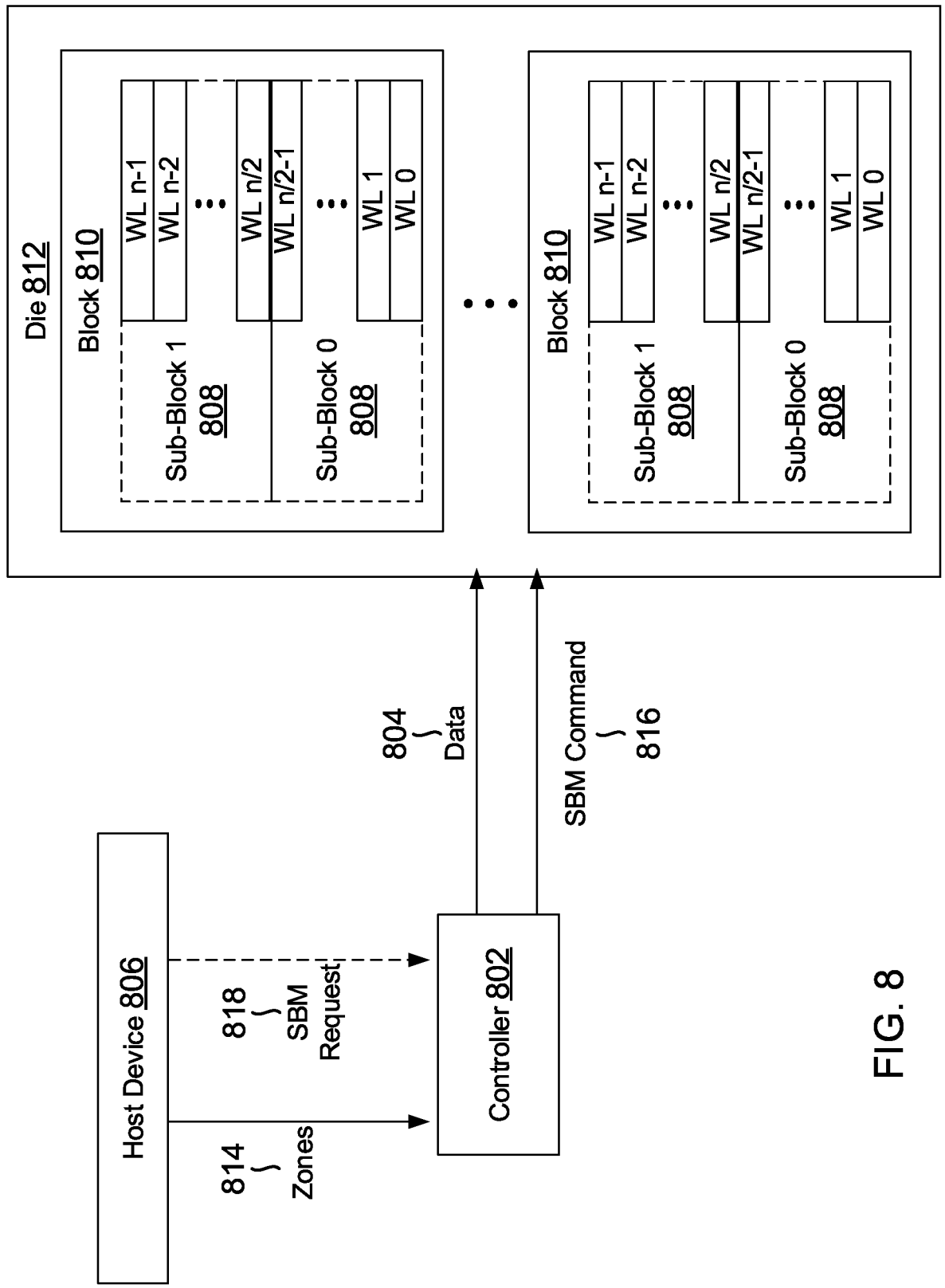
FIG. 8 is a conceptual diagram illustrating an example of a controller of the storage device of FIG. 1 that writes data to sub-blocks mapped to different zones.

FIG. 8 illustrates an example diagram 800 of a controller 802 of a storage device that writes data 804 received from a host device 806 in sub-blocks 808 of different blocks 810 of a die 812 according to zones 814. For example, controller 802 may correspond to controller 123 of the storage device 102 in FIG. 1, host device 806 may correspond to host device 104 in FIG. 1, blocks 810 may correspond to blocks 402 of FIG. 4, data 804 may correspond to data 119 of FIG. 1, and zones 814 may correspond to zones 602 of FIG. 6. Each block 810 may include n word lines (e.g. 128 word lines or another number n) that are divided into different sub-blocks 808 as described above. For example, half of the word lines of a block (e.g. a lower stack of word lines from WL 0 to WL n/2−1) may be included in one sub-block, while the other half of the word lines of a block (e.g. an upper stack of word lines from WL n/2 to WL n−1) may be included in another sub-block, where n is the number of word lines in the block. The controller 802 may read, program, and erase data in the sub-blocks 808 in response to a SBM command 816 that the controller generates and sends to the die 812 for execution. For instance, when the die 812 receives SBM command 816, circuitry in the die may be activated or enabled that allows different voltages to be applied to the word lines in different sub-blocks to perform simultaneous reads and programs or independent erases. The controller 802 may issue the SBM command 816 in response to receiving a definition of the zones 814 from the host 806. The controller may also issue the SBM command in response to receiving a request 818 from the host 806 to enable SBM.

In operation, the host 806 may send a definition of the zones 814 to the controller 802, which indicates to the controller that data is to be written to zones in ZNS. The controller may then determine if a number of open zones in the storage device is greater than or equal to an open zone threshold (e.g. 10 or some other pre-defined number). For instance, the controller may check if the host plans to write data to more than 10 zones, which would generally require at least 10 open blocks. If the number of open zones is less than the threshold (e.g. there is an acceptable number of open blocks that would result from mapping zones to individual blocks, such as nine blocks or less in total), the controller may map the LBAs of each zone 814 to single physical blocks as described above in FIG. 7. Otherwise, if the number of open zones meets the threshold, the controller may map the LBAs of each zone 814 to sub-blocks 808, as described below with respect to any of FIGS. 9-11. For instance, when mapping LBAs to PBAs in the L2P mapping table 120, 205, the controller may further indicate a flag bit (e.g. 0 or 1) indicating a respective sub-block of each physical block to which the LBAs are mapped. Each application of the host may then write data to a respective zone, e.g., by indicating a sequential range of LBAs to the controller, and the controller may translate the indicated LBAs to the mapped sub-block 810 and write the data in the sub-block accordingly. Since sub-blocks are independently eraseable, the mapping of zones to sub-blocks maintains the advantage of ZNS of reduction or elimination of GC to reduce write amplification, while further mitigating the aforementioned disadvantages of ZNS.

For example, if the number of open blocks that would result from single block mapping would be too large and thus cause significant DR issues, the controller 802 may map each zone to two sub-blocks 808 in different blocks 810 to reduce the number of open blocks. FIG. 9 illustrates an example of an L2P mapping table 900 which the controller may create that maps each zone to two sub-blocks 904 in different blocks 902. In the example of FIG. 9, each zone spans 64 MB in size with a 512 byte sector size, and thus each zone may include 125000 LBAs. Moreover, each block is able to store 64 MB of data, and thus each sub-block is able to store 32 MB of data. Thus, rather than mapping each zone (all 125000 LBAs) to each block 902 as illustrated above in FIG. 7, here the controller maps a first half of each zone (32 MB of data) to a sub-block in one block and a second half of each zone (32 MB of data) to a sub-block in another block. For example, the controller may map LBAs 0-62499 (the first half of zone 0) to sub-block 0 of block 0, the controller may map LBAs 62500-124999 (the second half of zone 0) to sub-block 0 of block 1, the controller may map LBAs 125000-187499 (the first half of zone 1) to sub-block 1 of block 0, and the controller may map LBAs 187500-249999 (the second half of zone 1) to sub-block 1 of block 1. In this way, when the host sequentially writes data in zone 0 and zone 1 beginning from the first LBA of each zone, only block 0 is initially written. Thus, the controller will only begin writing to block 1 after the first half of zones 0 and 1 are filled and block 0 is fully written (i.e. block 0 becomes a closed block). This approach reduces the total number of open blocks that will result, e.g. by half. For instance, even though zone 0 and 1 are half-way filled, only one block (block 1) will be open, rather than two blocks (both blocks 0 and 1) as would be the case in the example of FIG. 7.

In another example, if a block later doubles in size due to scaling such that one sub-block now spans a zone size (rather than a block as before), the controller may map the zone to one sub-block to accommodate the scaling and still maintain the reduction or elimination of GC. FIG. 10 illustrates an example of an L2P mapping table 1000 which the controller may create that maps each zone to one sub-block 1004 in different blocks 1002. In the example of FIG. 10, each zone spans 64 MB in size with a 512 byte sector size, and thus each zone may include 125000 LBAs. Moreover, the size of each block has increased due to scaling such that each block is able to now store 128 MB of data, and thus each sub-block is able to store 64 MB of data. Thus, rather than mapping half of each zone (62500 LBAs) to each sub-block as illustrated above in FIG. 9, here the controller maps each zone to each double-sized sub-block. For example, the controller may map LBAs 0-62499 (the first half of zone 0) and LBAs 62500-124999 (the second half of zone 0) to sub-block 0 of block 0 using similar sub-block mapping as described above with respect to FIG. 9. In this way, even when blocks double in size due to scaling, unused space in each block for ZNS can be avoided by mapping the entire zone to the sub-block. This approach also maintains the reduction or elimination of GC since sub-blocks can be erased independently even when the number of word lines in a block has increased.

In a further example, if the controller receives an indication from the host (e.g. in SBM request 818) that zones will not be completely written (e.g. the application will only write a small amount of data to those zones), the controller may map the zones to individual sub-blocks to prevent a running out of zone condition. FIG. 11 illustrates an example of an L2P mapping table 1100 which the controller may create that maps two zones to one sub-block 1004 in the same block 1102. In the example of FIG. 11, each zone spans 64 MB in size with a 512 byte sector size, and thus each zone may include 125000 LBAs. Moreover, each block is able to store 64 MB of data, and thus each sub-block is able to store 32 MB of data. Thus, rather than mapping one zone to two sub-blocks as illustrated above in FIG. 9, here the controller maps half of each zone to a sub-block based on the indication that the other half of each zone will be unused (no data will be stored in those LBAs). For example, the controller may map LBAs 0-62499 (the first half of zone 0) to sub-block 0 of block 0 and LBAs 125000-187499 (the first half of zone 1) to sub-block 1 of block 0 using similar sub-block mapping as described above with respect to FIG. 9. However, the controller may not map LBAs 62500-124999 (the second half of zone 0) and LBAs 187500-249999 (the second half of zone 1) to block 1, unlike in the example of FIG. 9, since these regions were indicated by the host to be unused. Instead, block 1 may be mapped to other zones. In this way, the number of zones in the storage device may effectively be increased. For instance, rather than mapping sub-blocks in blocks 0 and 1 to zones 0 and 1 as described above in the example of FIG. 9, here the controller may map sub-blocks only in block 0 to zones 0 and 1 since half of each zone will not be written, thus allowing the controller to map block 1 to two more half-written zones. Thus, in response to an indication from the host (e.g. in a request to activate SBM or in some other message) that its applications will only store a small amount of data in the various zones, the controller may allow more blocks to be available for mapping to additional zones.

Figure 12:
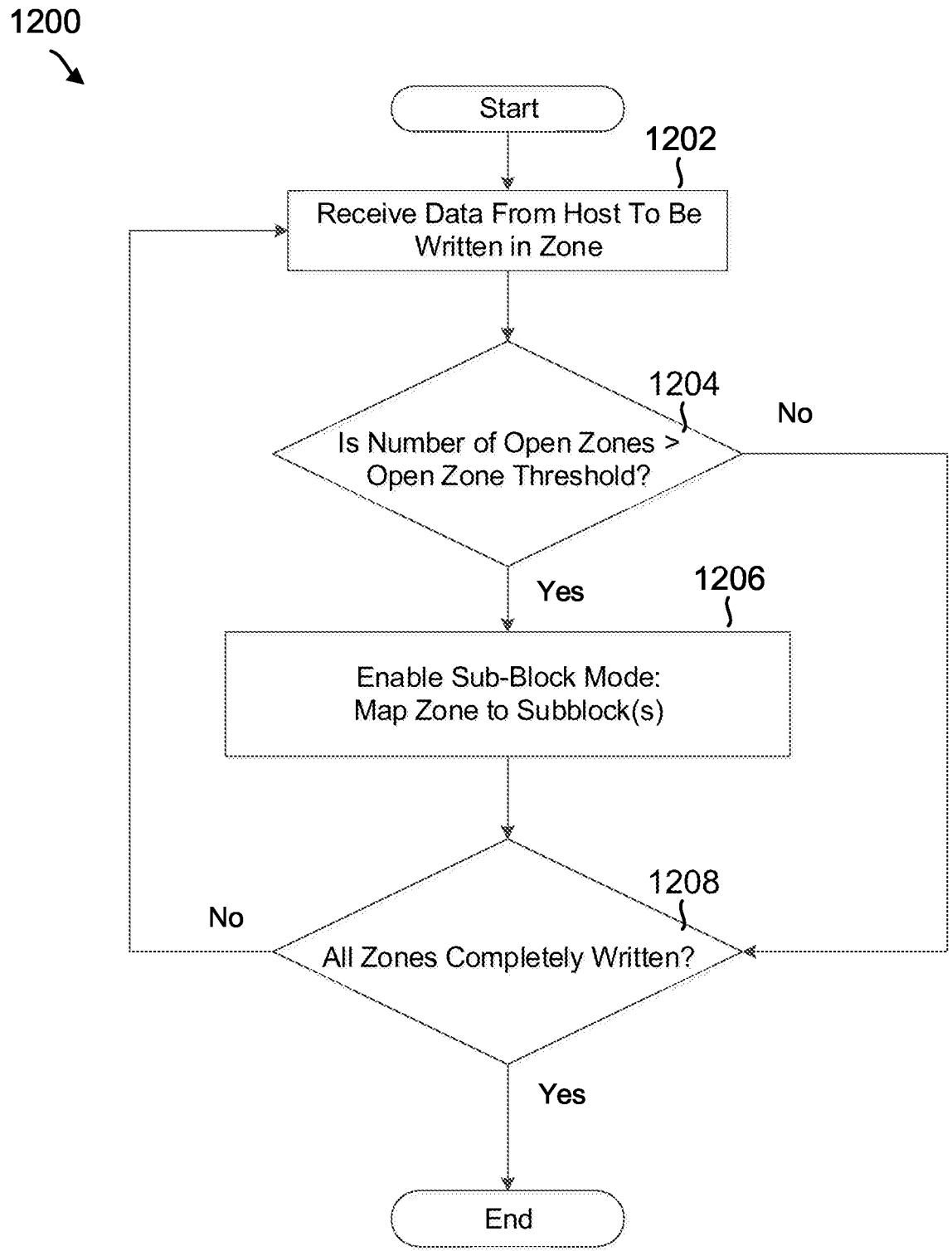
FIG. 12 is a flow chart illustrating a method for writing data to zones mapped to sub-blocks, as performed by the storage device of FIG. 1.

FIG. 12 illustrates an example flow chart 1200 of a method for writing data to zones based on sub-block mapping. For example, the method can be carried out in a storage device 102 such as the one illustrated in FIG. 1. Each of the steps in the flow chart can be controlled using the controller as described below (e.g. controller 123, 802), or by some other suitable means.

As represented by block 1202, the controller may receive data from a host to be written in a zone (e.g. in ZNS). The zone may include a plurality of logical addresses. For example, referring to FIGS. 6-8, the controller 702, 802 may receive data 704, 804 from the host device 706, 806 to be written in a zone 602, 712, 814. The zone 602 may include a plurality of logical addresses 604. The controller 702, 802 may receive from the host 706, 806 an association of the zone 602 with the logical addresses 604. For instance, the controller may receive a mapping of the zones to logical addresses, such as illustrated in FIG. 6, in a message from the host indicating zones 712, 814.

As represented by block 1204, the controller may determine whether the number of open zones meets an open zone threshold. If the number of open zones meets the open zone threshold, then as represented by block 1206, the controller may enable a sub-block mode (SBM) and map the zone to sub-block(s) of memory, e.g., as described above with respect to FIGS. 8-11. Otherwise, if the number of open zones does not meet the open zone threshold, the controller may map zones to blocks, e.g., as described above with respect to FIG. 7.

For example, referring to FIGS. 1 and 6-11, the memory (e.g. NVM 110) may comprise a plurality of blocks 708, 810, 902, 1002, 1102, where each of the blocks includes a plurality of sub-blocks 808, 904, 1004, 1104, and the controller 123, 802 may map a zone 602 to at least one of the sub-blocks. Each of the sub-blocks may be independently readable, programmable and erasable, e.g., as described above with respect to FIG. 8. The controller may determine a number of open zones (e.g. a number of the zones 602 that are open, or correspond to an open block), and map the open zones to the at least one of the sub-blocks in response to the number of open zones meeting a threshold (e.g. an open zone threshold, such as 10 or some other number).

In one example, the zone may be mapped to two of the sub-blocks, the two of the sub-blocks being from different blocks. In this example, each of the different blocks may include another sub-block mapped to a different zone. For instance, referring to FIG. 9, zone 0 may be mapped to sub-block 0 in block 0 and sub-block 0 in block 1. Moreover, each of the blocks (e.g. blocks 0 and 1) may include another sub-block (e.g. sub-block 1) mapped to a different zone (e.g. zone 1).

In another example, the zone may be mapped to one of the sub-blocks in response to an indication from the host that the zone is partially unused, the one of the sub-blocks being in one of the blocks. In this example, the one of the blocks may include another sub-block mapped to a different zone. For instance, referring to FIG. 11, zone 0 may be mapped to sub-block 0 in block 0 in response to an indication from host 806 that zone 0 will not be completely written. Moreover, block 0 may include another sub-block (e.g. sub-block 1) mapped to a different zone (e.g. zone 1). The controller may receive a request (e.g. SBM request 818) to write data 804 associated with zones 814 in the sub-blocks 808, and map each of the zones to at least one of the sub-blocks in response to the request. The request may include the indication from the host that the zone is partially unused.

Finally, as represented by block 1208, the controller may determine whether all zones have been written with data from the host. If not, then the controller will write the data in a zone (as mapped to sub-blocks or blocks as described above at 1204) and repeat the above process for each zone. Otherwise, if all the zones have been written with data, the process will end.

Accordingly, the storage device described in the present disclosure may mitigate the limitations of ZNS, including a large number of open blocks with poor DR, inflexibility for increased block sizes, and limited available zones. By allowing each zone to be mapped to two sub-blocks in different blocks, a smaller number of open blocks in the storage device may result than in traditional ZNS, leading to higher data reliability. Moreover, in cases where less data of a particular application is being programmed and the storage device is running out of zones, mapping each zone to one sub-block may effectively increase the number of zones during run-time. Furthermore, the benefits of ZNS in reducing GC and write amplification may still be maintained even when the block sizes of the storage device has scaled or increased, since mismatches between zone capacity and block size may be avoided due to sub-block mapping and the full block capacity may continue to be used.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A storage device, comprising:
a memory comprising a plurality of blocks, wherein each of the blocks includes a plurality of sub-blocks; and
a controller configured to map a zone to at least one of the sub-blocks, wherein the zone includes a plurality of logical addresses;
wherein the controller is further configured to determine a number of open zones, and to map the zone to the at least one of the sub-blocks in response to the number of open zones meeting a threshold.

2. The storage device of claim 1, wherein each of the sub-blocks is independently programmable and erasable.

3. The storage device of claim 1, wherein the controller is further configured to receive from a host an association of the zone with the logical addresses.

4. The storage device of claim 1, wherein the zone is mapped to two of the sub-blocks, the two of the sub-blocks being from different blocks.

5. The storage device of claim 4, wherein each of the different blocks includes another sub-block mapped to a different zone.

6. The storage device of claim 1, wherein the zone is mapped to one of the sub-blocks in response to an indication from a host that the zone is partially unused, the one of the sub-blocks being in one of the blocks.

7. The storage device of claim 6, wherein the one of the blocks includes another sub-block mapped to a different zone.

8. A storage device, comprising:
a memory comprising a plurality of blocks, wherein each of the blocks includes a plurality of sub-blocks; and
a controller configured to determine a number of open zones, and to map open zones to the sub-blocks in response to the number of open zones meeting a threshold.

9. The storage device of claim 8, wherein each of the sub-blocks is independently readable and programmable.

10. The storage device of claim 8, wherein the controller is further configured to receive from a host an association of each of the open zones with a plurality of logical addresses.

11. The storage device of claim 8, wherein each of the open zones is mapped to two of the sub-blocks, the two of the sub-blocks being from different blocks.

12. The storage device of claim 8, wherein each of the open zones is mapped to one of the sub-blocks in response to an indication from a host that the open zones will not be completely written.

13. A storage device, comprising:
a memory comprising a plurality of blocks, wherein each of the blocks includes a plurality of sub-blocks; and
a controller configured to receive a request to write data associated with zones in the sub-blocks, and to map each of the zones to at least one of the sub-blocks in response to the request;
wherein the controller is further configured to determine a number of the zones that are open, and to map the zones to the sub-blocks in response to the number of the zones that are open meeting a threshold.

14. The storage device of claim 13, wherein each of the sub-blocks is independently readable and erasable.

15. The storage device of claim 13, wherein the controller is further configured to receive from a host an association of each of the zones with a plurality of logical addresses.

16. The storage device of claim 13, wherein each of the zones is mapped to two of the sub-blocks, the two of the sub-blocks being from different blocks.

17. The storage device of claim 13, wherein the request includes an indication from a host that the zones are partially unused.

18. The storage device of claim 17, wherein each of the zones is mapped to one of the sub-blocks in response to the indication.

* * * * *